United States Patent [19]

Goldstein et al.

[11] 4,150,162

[45] Apr. 17, 1979

[54] FISH FEEDING PRODUCT AND METHOD OF MAKING THE SAME

[75] Inventors: Joel Goldstein, Ambler; Albert Abrevaya, Chalfont, both of Pa.

[73] Assignee: Aquarium Pharmaceuticals, Inc., Perkasie, Pa.

[21] Appl. No.: 845,989

[22] Filed: Oct. 27, 1977

[51] Int. Cl.² ............................................. A23K 1/10
[52] U.S. Cl. ................................. 426/335; 426/515; 426/634; 426/643; 426/646; 119/3
[58] Field of Search .............. 426/630, 634, 72, 1, 426/74, 335, 643, 646, 805, 512, 515; 119/1, 3, 5

[56] References Cited

U.S. PATENT DOCUMENTS

| | | | |
|---|---|---|---|
| 2,825,648 | 3/1958 | Corbett | 426/643 |
| 3,361,114 | 1/1968 | Axelrod | 119/3 |
| 3,361,566 | 1/1968 | Axelrod | 426/643 |
| 3,410,689 | 11/1968 | Nathan | 426/1 X |
| 3,796,812 | 3/1974 | Baensch | 426/643 X |
| 3,931,414 | 1/1976 | Popeil | 426/643 |

OTHER PUBLICATIONS

Rose et al. "Condensed Chemical Dictionary" 7th Edition 1970 p. 91.

*Primary Examiner*—R. B. Penland
*Attorney, Agent, or Firm*—Seidel, Gonda, Goldhammer & Panitch

[57] ABSTRACT

The present invention relates to a fish feeding block and method of making the block. The fish feeding block is comprised of a supporting block formed of a solidified mixture of plaster of Paris and a hygroscopic substance. A plurality of fish food pellets are interspersed substantially throughout the supporting block. A piece of freeze dried fish food is also disposed within the supporting block. The block is formed by mixing plaster of Paris with water and a hygroscopic substance to form a first mixture. A plurality of fish food pellets are mixed into the first mixture to form a second mixture. The second mixture is thereafter poured into a mold. The second mixture is allowed to set within the mold until it reaches a thickened state. A piece of freeze dried fish food is then injected into the second mixture. The second mixture is allowed to solidify and then removed from the mold.

12 Claims, 3 Drawing Figures

FISH FEEDING PRODUCT AND METHOD OF MAKING THE SAME

BACKGROUND OF THE INVENTION

The invention relates to improvements in time release fish feeding products for use in aquariums. The invention relates particularly to fish feeding products for use in aquariums which have a filtration and aeration mechanism. A method of producing a time release fish food product is disclosed in U.S. Pat. No. 2,825,648, patented on Mar. 4, 1958. In this patent, only a single form of dried fish meal, consisting of shredded shrimp, fish or lobster, is mixed throughout a supporting block of plaster of Paris.

SUMMARY OF THE INVENTION

The present invention relates to a fish feeding block and method of making the block. The fish feeding block is comprised of a supporting block formed of a solidified mixture of plaster of Paris and a hygroscopic substance. A plurality of fish food pellets are interspersed substantially throughout the supporting block. A piece of freeze dried fish food is also disposed within the supporting block. The block is formed by mixing plaster of Paris with water and a hygroscopic substance to form a first mixture. A plurality of fish food pellets are mixed into the first mixture to form a second mixture. The second mixture is thereafter poured into a mold. The second mixture is allowed to set within the mold until it reaches a thickened state. A piece of freeze dried fish food is then injected into the second mixture. The second mixture is allowed to solidify and then removed from the mold.

In the preferred embodiment, the piece of freeze dried food is substantially larger than the fish food pellets and the hygroscopic substance is preferably a microcrystalline cellulose substance, such as is commercially available from the FMC Corporation under the trademark AVICEL. Also, the supporting block is preferably formed in the configuration of a stepped pyramid with the freeze dried fish food disposed substantially at the center of the base of the pyramid and totally within the supporting block.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
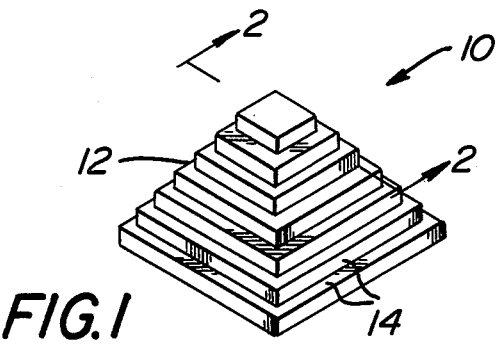
FIG. 1 is a perspective view of a fish feeding block in accordance with the present invention.
Figure 2:
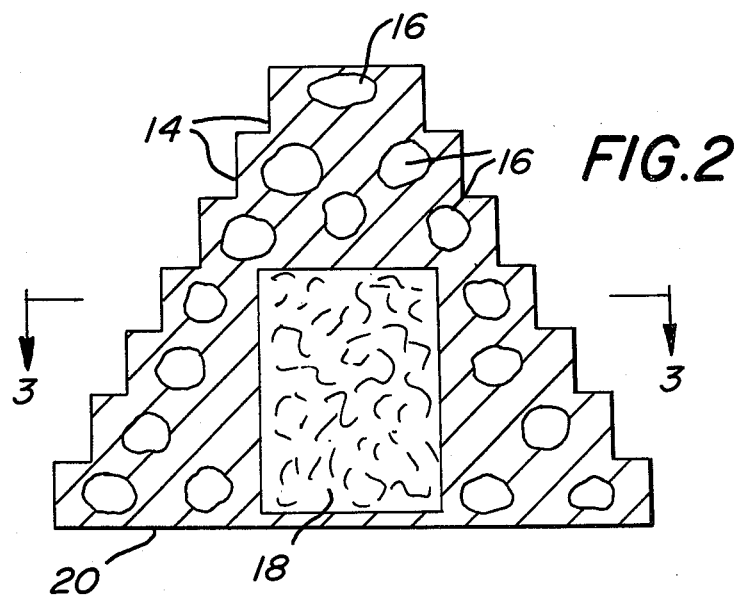
FIG. 2 is a cross-sectional view taken along lines 2—2 of FIG. 1, shown on an enlarged scale.
Figure 3:
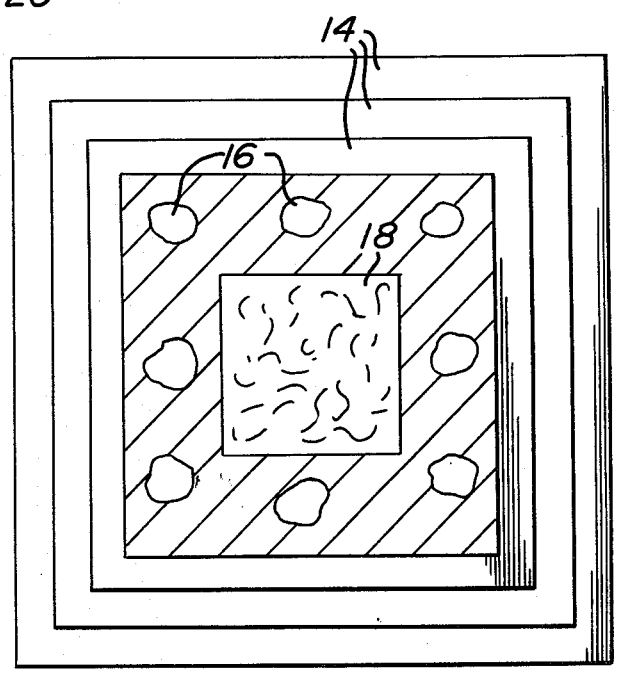
FIG. 3 is a cross-sectional view taken along lines 3—3 of FIG. 2.

Referring to the drawings in detail, wherein like numerals indicate like elements, there is shown in FIG. 1 a product in accordance with the present invention designated generally as 10. The product 10 is formed of a solid block 12 generally in the configuration of a pyramid. The pyramid-shaped block 12 includes a plurality of steps 14 in its outer surfaces. The block 12 thus takes the shape of a stepped pyramid. A plurality of fish food pellets 16 are randomly interspersed within the block 12. A piece of freeze dried fish food 18, which is substantially larger than each of the food pellets 16, is also disposed within the block 12.

The product 10 is adapted for use within aquariums. The block 12 is placed within an aquarium and the block 12 breaks apart over a period of several days to expose the food pellets 16 and the freeze dried food 18. The food pellets 16 preferably consist of a mixture of numerous nutrient fortified food products such as soybean meal, fish meal, ground yellow corn, ground wheat, and the like fortified with vitamin supplements. Fish food pellets of the type used in the present invention are commercially available from the Purina Corporation.

The block 12 has a base 20, which in the preferred embodiment is approximately 1½ inches square. Also, in the preferred embodiment, the block 12 is approximately 1½ inches high. A block of this size, produced by the process of the present invention, dissipates over a period of approximately 7 days. The food pellets 16 thus intermittently become exposed to the water in the aquarium and provide a continuous diet of food to the fish within the aquarium. The food pellets 16 at the surface of the block 12 which is in contact with the water in the aquarium soften or dissolve and thus are rendered edible for the fish. The food pellets 16, which are totally within the block, remain substantially dry until they are exposed to the water by the dissipation of the block about the pellets. Approximately midway through the 7 day feeding cycle, the freeze dried food 18 is exposed. A dietary supplement in the form of freeze dried food is thus provided for the fish in the aquarium. The freeze dried fish food is preferably a piece of freeze dried shrimp but may be any freeze dried food which is edible by fish. By using the food product of the present invention, fish within an aquarium can be automatically fed over a 7 day period with both a basic food and a dietary supplement.

The product 10 is produced in the following manner. A mixture of plaster of Paris, water and a hygroscopic substance is initially stirred with a high speed mixer. As will be described later, prior to use in the mixture, the water is made slightly acidic and a mold inhibitor is added. Equal weights of water and plaster of Paris are preferably utilized. The use of a microcrystallline cellulose substance, such as AVICEL, for the hygroscopic substance, allows the use of a high proportion of water to plaster. Approximately 2-6% by weight of the hygroscopic substance to the total weight of the water and plaster of Paris has been found suitable with approximately 4% being the optimum amount. The use of a hygroscopic substance within the mixture allows a larger amount of water to be used than would otherwise be possible. This in turn results in a block 12 with a higher porosity. If a block of still a higher porosity is desired, a higher percentage of both water and the hygroscopic substance would be used.

It has been found that when normal tap water is used to make the feeding blocks, the blocks are susceptible to mold growth. To overcome this problem, a mold inhibitor is added to slightly acidic deionized water. Preferably, one ounce of 85% concentrated phosphoric acid is mixed in approximately 12 gallons of deionized water. Calcium propionate is also added to the acidified water as a mold inhibitor to a concentration of about 0.75%. The resultant slurry of mixture of the plaster of Paris, the hygroscopic substance and the acidic deionized water has a pH approximately between 6.2 and 6.8 prior to hardening.

In the preferred process, which will be described more fully hereinafter, short time periods are used for performing the various steps. Therefore, it is advantageous to prepare the mixture of plaster of Paris, water and the hygroscopic substance in small batches. A typical batch would be comprised of 250 milliliters of water, 250 grams of plaster and 20 grams of the microcrystalline cellulose substance, such as AVICEL.

The mixture of plaster of Paris, water and the hygroscopic substance is stirrred by a mixer for a short period of time prior to the introduction of the food pellets 16. A high speed mixer such as a pharmaceutical or milkshake mixer wherein an impeller rotates at approximately 16,000 rpm without a load is utilized. The rpm of the mixer drops slightly under a load. The use of such a high speed mixer has resulted in a mixture with an optimum set up time. That is, the set up time is sufficiently fast to be an economical process, while at the same time not unduly fast so that the steps of the process can not be performed.

After stirring the initial or first mixture for a short period of time, a plurality of the fish food pellets 16 are introduced into the initial mixture and the stirring is continued. When utilizing the above high speed mixing technique with the ingredients in the above specifed amounts, the initial mixture is stirred for approximately 2 minutes and 15 seconds. At that point, the fish food pellets 16 are introduced into the mixture and the stirring is continued for approximately another 15 seconds. When the mixture is prepared in batches of 250 milliliters of water, 250 grams of plaster of Paris and 20 grams of the microcrystalline cellulose material, approximately 25 grams of the fish food pellets are introduced into the initial mixture.

The mixture of plaster of Paris, water, hygroscopic substance and fish food pellets is thereafter poured into molds having a stepped pyramid configuration. The molds are preferably made of a silicone rubber material, which allows for the easy removal of the blocks 12 from the molds. The mixtures within the molds are allowed to set up to a thickened consistency. An optimum consistency is reached in approximately 2½ minutes. A piece of freeze dried fish food 18 is then injected into the mixture within each mold. The piece of freeze dried fish food 18 is injected generally in the center of the base and pushed completely within the mixture. The freeze dried fish food 18 is injected into the mixture within the mold after the mixture has reached a thickened consistency so that the freeze dried fish food 18 is not contaminated by the water in the mixture. If the freeze dried fish food 18 is injected too early, too much water remains free within the mixture and contaminates the freeze dried fish food 18.

Under prior production techniques, the insertion of a piece of freeze dried food could not be satisfactorily accomplished. A piece of freeze dried food inserted into a plaster of Paris slurry would absorb too large a quantity of water. The freeze dried food would thus decompose or rot over a period of time. This problem is solved by the process of the present invention. When the mixture of water, plaster of Paris and the microcrystalline cellulose substance is stirred or whipped at a high speed, a sufficient amount of the water is absorbed or trapped by the mixture. The absorption or entrapment of the water prevents the hydration of a piece of freeze dried food inserted into the mixture. Thus, when a piece of freeze dried food is inserted into the thickened mixture, the freeze dried food remains relatively dry and does not decompose or rot over a period of time.

When the preferred batch of 250 milliliters of water, 250 grams of plaster of Paris, 20 grams of microcrystalline cellulose material and 25 grams of fish food pellets is utilized, approximately 16 molds of the preferred size can be filled. After the mixtures within the molds have completely hardened, they are manually removed and are ready for packaging.

In use, the product 10 is placed within the base of an aquarium. By using equal parts by weight of water and plaster, which is a high concentration of water for a plaster mixture, the resultant product 10 has a high porosity. Because of this high porosity and the general pyramid shape, the block 12 slowly breaks up over a period of about 7 days. The fish pellets 16 are released continually through the 7 day period and the piece of freeze dried fish food 18 is exposed approximately midway through the 7 day cycle. In its preferred embodiment, the product 10 will feed 20 average-size aquarium fish in a 10 gallon tank for approximately 7 to 8 days depending on the temperature and the pH of the aquarium water. The product 10 is preferably used in an aquarium having filtration and aeration equipment. Also, the temperature of water in the aquarium should not be less than 72° F. and the pH should be between 6.8 and 7.2.

The present invention may be embodied in other specific forms without departing from the spirit or essential attributes thereof and, accordingly, reference should be made to the appended claims, rather than to the foregoing specification as indicating the scope of the invention.

What is claimed is:

1. A method of making a timed release fish feeding block comprisng the steps of:
    (a) mixing at a high speed in a rotary mixer approximately one part by weight plaster of Paris, approximately one part by weight of water, and microcrystalline cellulose in an amount effective to form a first mixture wherein a sufficient amount of water is absorbed to prevent hydration of freeze dried fish food subsequently inserted into said mixture;
    (b) mixing a plurality of fish food pellets into said first mixture to form a second mixture;
    (c) pouring said second mixture into a mold;
    (d) allowing said second mixture to set in said mold until said second mixture reaches a thickened state;
    (e) injecting a piece of freeze dried fish food into said second mixture after performing step d said freeze dried fish food being generally in the center of said mold and completely within said second mixture;
    (f) allowing said second mixture to solidify; and
    (g) removing said solidified mixture from said mold.

2. A method in accordance with claim 1 wherein step (a) includes mixing said first mixture with a high speed rotary mixer with its impeller rotating at approximately 16,000 rpm.

3. A method in accordance with claim 1 wherein said fish food pellets mixed in step (b) are substantially smaller in size than said piece of freeze dried fish food injected in step (e).

4. A method in accordance with claim 1 wherein step (a) includes mixing approximately between 2 and 6% by weight of said microcrystalline cellulose to the total amount by weight of plaster of Paris and water.

5. A method in accordance with claim 1 wherein step (a) includes mixing approximately 4% by weight of said microcrystalline cellulose to the total amount by weight of plaster of Paris and water.

6. A method in accordance with claim 1 wherein step (a) includes mixing approximately 250 milliliters of water with 250 grams of plaster of Paris and 20 grams of said microcrystalline cellulose.

7. A method in accordance with claim 1 wherein step (a) includes mixing said first mixture for approximately a 2 minute and 15 second interval, step (b) includes mixing in said pellets after said interval of step (a) for an additional 15 second interval, and step (c) includes pouring said second mixture immediately after said interval of step (b).

8. A method in accordance with claim 1 wherein said mold used in step (c) is in the form of a stepped pyramid.

9. A method in accordance with claim 1 wherein said water is slightly acidic deionized water with a mold inhibitor added to said water.

10. A timed release fish feeding block comprising:
a block formed of a solidified mixture of approximately equal parts by weight of plaster of Paris and water, and hydroscopic microcrystalline cellulose;
a plurality of fish food pellets interspersed substantially throughout said block; and
a piece of freeze dried fish food generally disposed within the center of said block, said hygroscopic microcrystallne cellulose being present in an amount effective to promote the absorption of a sufficient amount of water to prevent hydration of said freeze dried fish food.

11. A fish feeding block in accordance with claim 10 wherein said block has a stepped pyramid configuration and said piece of freeze dried fish food is disposed substantially at the center of the base of said pyramid and totally within said block.

12. A fish feeding block in accordance with claim 10 wherein said fish feeding pellets are substantially smaller than said piece of freeze dried fish food.

* * * * *